Nov. 15, 1932.                    D. L. JOHNSON                    1,887,491
                                   DECOY HOBBLE
                                Filed Feb. 21, 1929
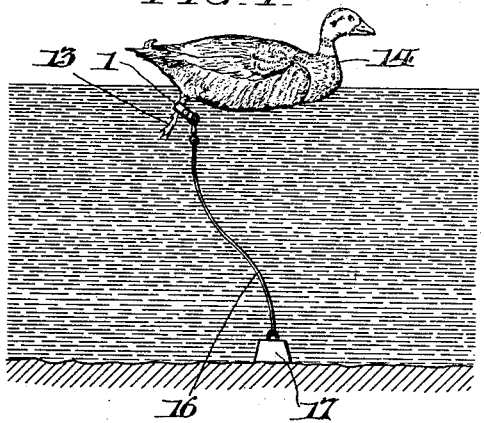
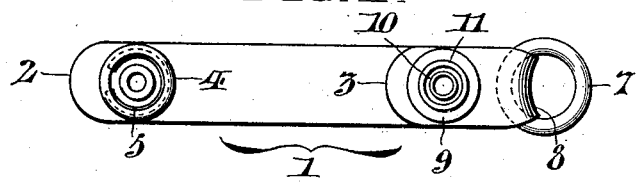
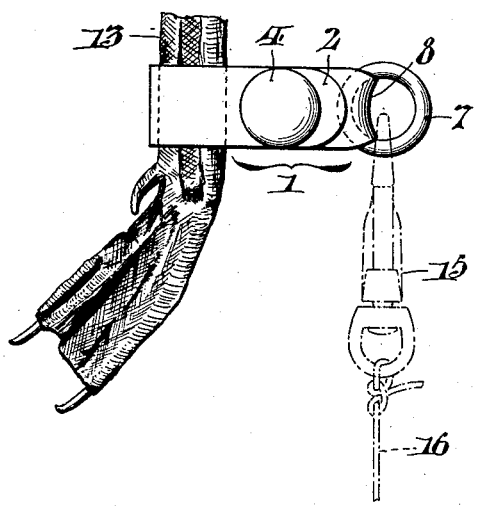
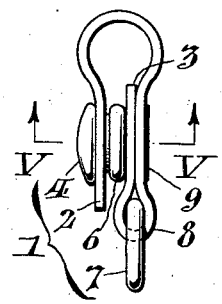
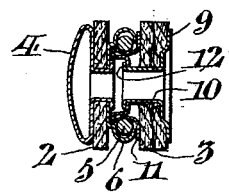
WITNESSES
INVENTOR:
David L. Johnson,
BY
ATTORNEYS.

Patented Nov. 15, 1932

1,887,491

UNITED STATES PATENT OFFICE

DAVID L. JOHNSON, OF OCEAN CITY, MARYLAND

DECOY HOBBLE

Application filed February 21, 1929. Serial No. 341,672.

This invention has reference to tethering or anchoring means, of the type adapted for application to the legs of live birds, "stooled" or set out as decoys to attract wild fowl to be shot by gunners from a concealed blind, sink-box, or other hidden location.

Ordinarily such devices or "hobbles" are used to anchor decoy ducks, brant or geese, to attract their kindred wild species, both over shoals as well as in deeper water. Geese are sometimes anchored to the shore or on land, being secured by appropriate tethering to stakes driven in the ground, or the bed of shoal water; whereas when used in deep water they are secured to weights or anchors. Ducks and brant are usually set out on shoals or deep water by stakes or anchorweights.

Decoys are employed only for a limited period of the shooting season in various parts of the country, and for the rest of the year are allowed to roam at large; or, they are kept in pens. During the gunning season they are invariably kept in pens and carried for convenience, usually by boat, to the location where the "shoot" is to take place. There they are put overboard and secured within range of the guns, ordinarily being "stooled" out before dawn with the gunners concealed by that time.

Hobbles for the noted purposes have been of varied types but many of them have had attendant disadvantages which I aim to eliminate. For example, a hobble attached about the neck of a decoy causes said decoy to act in an unnatural manner when "stooled" out, as well as necessitating its application and removal every time the fowl was used. Hobbles made of wire have been common, but they quickly deteriorate in use and frequently cause injury to the leg of the decoy, after which said decoy becomes useless for further shoots. Other hobbles have been secured by penetration of the web of the decoy's foot, but such method is cruel and inefficient as it impairs swimming movement. Still other hobbles are riveted about the legs of the decoys at the commencement of the gunning season and cut off at the end of such season, but this manner of securing hobbles in place requires the employment of two persons, one to hold the decoy and the other to apply and secure the hobble; while at the end of the season the hobbles are destroyed incident to being cut away. Slip-noose hobbles are required to have a total length sufficient to spread the loop wide enough to pass over the extended spread of the foot of the decoy, and such hobbles, therefore, have to be put on and taken off each time a decoy is stooled out. Consequently, such hobbles are so long that they cannot be put on the decoy at the beginning of the shooting season and left on until the season closes.

The primary object of my invention is to overcome all the noted objections by providing a removable hobble which can be easily snapped around the leg of a decoy, by one person, and remain secure in place during the gunning season, without in any way impairing the decoy's activity; and, just as readily detached at the end of said season.

With the stated object in view, my invention essentially consists of a flexible, non-abrasive strap with male and female snap components at the opposed ends, one of said components serving to permanently secure an attaching ring in a retroverted end of the strap.

In the accompanying drawing:

Fig. I is a view illustrating a decoy anchored by means of a device including my novel hobble.

Fig. II is an inside plan view of the hobble in extended position.

Fig. III is a view of the hobble in closed or active position with a fragmentary portion of a tethering connector attached thereto.

Fig. IV is a plan view of the device as viewed from above the preceding illustration, with the tethering connector removed; and, Fig. V is a section on the line V—V of Fig. IV.

Referring more in detail to the drawing, my novel hobble 1 consists of a short strap or length of flexible, non-abrasive material, such as leather or the better grades of rawhide having the respective ends 2, 3 conveniently rounded to give a neat finish. To one end 2, for example, of the hobble strap 1, I secure the female component 4 of a conventional snap "Carr" fastener, the same including a split spring-ring 5 located in the bead-over entrant side 6 thereof.

The other end of the hobble strap 1 is passed through a suitable connector ring 7 and looped over or retroverted at 8, and securely riveted—at a point remote from said ring—by means of the male member 9 of the snap fastener. This male member 9, it will be best seen from Fig. V, consists of a shank portion 10, and a clamping piece 11, with the former flared-over or riveted to the latter at 12, whereby a firm and secure attachment is made. It is also to be noted that I, preferably, make the ring 7 and the snap fastener components of non-corrodible material. The loop at 8 may be retroverted to either side of the strap.

In use, my improved hobble is easily attached around one leg 13 of the decoy 14, by bringing the male component 9 into "snap" engagement with the female component 4, whereupon said parts are securely locked by the spring-ring 5, in an obvious manner. The swivel snap-hook 15, of the tethering line 16, is next attached to the connector ring 7, whereupon the decoy 14 is put overboard into the water, and it will be apparent that, if the tethering line 16 be attached to an anchor weight 17, for example, that said decoy is free to swim around with perfect ease and comfort. The same is true when the line 16 is attached to a long line, anchored at both ends, and provided with snap-hook lines for a dozen or more decoys.

The total length of my hobble is very short by reason of its construction, connections and the manner of attachment. This is of primary importance as it permits the hobble to be put on the decoy's leg at the beginning of the shooting season and to remain on the leg for the months of the season (while adapted to be removed at any desired time), for the reason that this construction permits a decoy, when at large on the land, or in the pen during the times such decoy is not stooled out, to move about freely without impediment or injury by being caught fast on something which entangles the hobble.

From the foregoing it is thought my invention will be well understood, but it is desired to herein enumerate some of its advantages. Firstly one person can easily apply the hobbles 1 to as many decoys as desired at the commencement of the gunning season, and just as readily remove the same at the end thereof. Secondly, the hobble 1 is constructed of materials and applied in a manner that in no way impairs the movements of the decoy 14 either in, or out of, the water. Thirdly, one man can stool out the live decoys before the shooting and can "take them up" after the shooting, while slip-noose hobbles require two men, in stooling out and taking up each day, one to hold the decoy and another to hold the leg with one hand and spread the slip-noose with the other hand before slipping the noose over the spread foot, if a number of decoys are to be stooled out. And lastly my improved hobble 1 does not have to be put on and taken off each time the decoy 14 is taken out for a shoot; while at the end of the season, when removed, it can be saved for a later season without deterioration, thereby effecting considerable economy as compared with devices of an analogous character heretofore employed. My hobble is particularly adapted for use when a large number of live decoys are to be stooled out at one blind, or a number of blinds, and in such circumstances may save as much as several hours of time by reason of the speed in stooling out by one man.

Having thus described my invention, I claim:

1. A hobble for setting out live decoys for wild-fowl comprising a flexible, non-abrasive strap, a snap-clasp with male and female members on the strap, one member of the clasp at one extremity of the strap, the opposite member at a point lengthwise of the strap to form a loop of fixed circumference adapted snugly to encircle the leg of the decoy when the clasp is closed, a loop at the other end of the strap, a ring in said loop adapted to receive the hook of a swiveled snap-hook attached to a tethering line, the strap and ring having a total length to permit free movement of the decoy while attached to the leg and detached from the snap-hook and anchor line.

2. A hobble for setting out live decoys for wild-fowl comprising a flexible, non-abrasive strap, a snap-clasp with male and female members on the strap, one member of the clasp at one extremity of the strap, the opposite member at a point lengthwise of the strap to form a loop of predetermined circumference adapted snugly to encircle the leg of the decoy when the clasp is closed, a retroverted loop at the other end of the strap formed by riveting the extremity of that end of the strap to the strap by the second-mentioned clasp member where its shank passes through the strap, a ring in said loop adapted to receive the hook of a swiveled snap-hook attached to a tethering line, the strap and ring having a total length to permit free movement of the decoy while attached to the leg and detached from the snap-hook and anchor line.

3. A new article of manufacture consisting of a hobble for live decoys for wild-fowl comprising a flexible, non-abrasive, non-metallic strap, means at one end for removably clasping the strap around the leg of the decoy by inter-engagement with means near the other end of the strap, said ends when folded together and clasped providing a loop of fixed circumference around the leg, means at the last mentioned end for attachment to a tethering line, and having a total length permitting free movement of the live decoy when at large while attached to the leg and detached from the tethering line during the shooting season.

In testimony whereof, I have hereunto signed my name at Philadelphia, Penna., this 19th day of February, 1929.

DAVID L. JOHNSON.